United States Patent
Blackwell et al.

(10) Patent No.: US 10,682,997 B2
(45) Date of Patent: Jun. 16, 2020

(54) BLEEDING DEVICE AND METHOD OF BLEEDING A HYDRAULIC SYSTEM

(71) Applicant: LIBERTY VEHICLE TECHNOLOGIES LIMITED, London (GB)

(72) Inventors: Anthony Blackwell, London (GB); Daniel Mutch-Mathieson, London (GB); Anthony Philips, London (GB); Laurie Rippin, London (GB); Benjamin Shepherd, London (GB); Philip Thomas, London (GB); Steven Young, London (GB)

(73) Assignee: Liberty Vehicle Technologies Limited, London (GB)

( * ) Notice: Subject to any disclaimer, the term of this patent is extended or adjusted under 35 U.S.C. 154(b) by 0 days.

(21) Appl. No.: 16/072,688

(22) PCT Filed: Jan. 25, 2017

(86) PCT No.: PCT/GB2017/050179
§ 371 (c)(1),
(2) Date: Jul. 25, 2018

(87) PCT Pub. No.: WO2017/129967
PCT Pub. Date: Aug. 3, 2017

(65) Prior Publication Data
US 2019/0031166 A1   Jan. 31, 2019

(30) Foreign Application Priority Data

Jan. 25, 2016  (GB) .................................. 1601325.2
Feb. 18, 2016  (GB) .................................. 1602862.3

(51) Int. Cl.
*B60T 11/30*  (2006.01)

(52) U.S. Cl.
CPC .................................... *B60T 11/30* (2013.01)

(58) Field of Classification Search
CPC ....................................................... B60T 11/30
(Continued)

(56) References Cited

U.S. PATENT DOCUMENTS 2,519,569 A * 8/1950 Hart .................... B60T 11/30
                                                                137/614.2
2,729,228 A * 1/1956 Stevenson ............ F15B 21/044
                                                                137/199

(Continued)

FOREIGN PATENT DOCUMENTS

DE           922634 C       1/1955
DE     102005028645 A1      1/2007
(Continued)

OTHER PUBLICATIONS

International Search Report, dated May 4, 2017 (PCT/GB2017/050179).
United Kingdom Search Report dated Jul. 8, 2016 (GB1601325.2).

*Primary Examiner* — Thomas W Irvin
(74) *Attorney, Agent, or Firm* — Robert L. Stearns; Dickinson Wright, PLLC (57) ABSTRACT

A bleeding device (1, 100) for bleeding air from a hydraulic system, which includes a bleed screw (2, 102) and a bleeding needle (3, 103) for unseating the bleed screw (2, 102) to enable any air trapped within the system to be bled. The bleed screw (2, 102) is receivable within a threaded bleed port (41) in a component of the system, such as a brake caliper (4). The bleed screw (2, 102) includes a socket (28, 128), a conical sealing face (27) and a radial fluid passage (24) between the sealing face (27) and the socket (28, 128). The bleed needle (3, 103) includes a plug (34, 134) for releasable engaging receipt within the socket (28, 128) of the valve member and a fluid passageway (31) which is in fluid (Continued)

communication with the radial fluid passage (24) of the bleed screw (2) when the plug (34, 134) is received within the socket (28, 128). The bleed screw (2, 102) is movable, in use, between a sealed position in which the sealing face (27) seats against the sealing face (43) of a bleed port (41) and a bleeding position in which the sealing face (27) is unseated to open fluid communication between the bleed port (41) and the fluid passageways (24, 31).

20 Claims, 3 Drawing Sheets (58) Field of Classification Search
USPC .......................................................... 188/352
See application file for complete search history.

(56) References Cited

U.S. PATENT DOCUMENTS

| | | | | |
|---|---|---|---|---|
| 2,892,614 | A * | 6/1959 | Majneri | F16K 15/04 251/347 |
| 3,050,080 | A * | 8/1962 | Pagano | B60T 11/30 137/614.17 |
| 3,727,638 | A * | 4/1973 | Zarennba, Jr. | F01M 11/0408 137/572 |
| 4,470,577 | A | 9/1984 | Warwick | |
| 4,786,029 | A * | 11/1988 | Laipply | F16L 37/40 137/614.05 |
| 4,989,639 | A * | 2/1991 | Sulwer | F16K 15/044 137/614.17 |
| 5,447,214 | A * | 9/1995 | Appelgren | B60T 11/30 188/352 |
| 5,560,457 | A * | 10/1996 | Rike | B60T 11/30 188/352 |
| 5,562,188 | A * | 10/1996 | Appelgren | B60T 11/30 188/352 |
| 5,853,071 | A * | 12/1998 | Robinson | B60T 11/30 188/352 |
| 5,960,922 | A * | 10/1999 | Riess | F15B 21/044 188/352 |
| 6,196,364 | B1 * | 3/2001 | Fouts | B60T 11/30 137/614.19 |
| 6,581,905 | B2 * | 6/2003 | Rafko | B60T 17/222 141/98 |
| 6,669,169 | B2 * | 12/2003 | Cornolti | B60T 11/30 251/149.6 |
| 8,578,964 | B2 * | 11/2013 | Maszull | B60T 17/222 137/523 |
| 8,656,965 | B2 * | 2/2014 | Iwata | B60T 17/222 141/98 |
| 10,132,246 | B2 * | 11/2018 | Lior | F01D 25/32 |
| 2003/0141478 | A1 | 7/2003 | Cornolti et al. | |
| 2005/0121642 | A1 * | 6/2005 | Purdy | B60T 17/222 251/343 |
| 2009/0212249 | A1 | 8/2009 | Maszull et al. | |
| 2016/0347301 | A1 * | 12/2016 | Gallagher | B60T 17/222 |
| 2018/0106312 | A1 * | 4/2018 | Meggiolan | B60T 17/222 |

FOREIGN PATENT DOCUMENTS

| | | |
|---|---|---|
| EP | 1122139 A1 | 8/2001 |
| EP | 2233750 A2 | 9/2010 |
| EP | 2386785 A1 | 11/2011 |
| WO | 2010091896 A1 | 8/2010 |

* cited by examiner

BLEEDING DEVICE AND METHOD OF BLEEDING A HYDRAULIC SYSTEM

BACKGROUND

1. Technical Field

This invention relates generally to a bleeding device and to a method of bleeding a hydraulic system. More specifically, although not exclusively, this invention relates to such a device and method for bleeding a hydraulic braking system and to a braking system component, braking system and vehicle incorporating such a bleeding device.

2. Related Art

Hydraulic braking systems incorporated in motor vehicles generally include one or more actuators each of which urges friction braking pads against a rotating element, such as a drum or disc, coupled to a wheel of the vehicle. The system normally includes one or more master cylinders operated by driver input to supply pressurised hydraulic fluid to the actuators. One known issue with hydraulic braking systems is that air may be introduced into the hydraulic circuit, for example in the event of component replacement, a defective or loosened connection or a leak in the system. Air is a compressible fluid and it is well known that its presence in a hydraulic braking circuit leads to sporadic or diminished braking effectiveness or, in extreme cases, brake failure.

It is conventional to include a bleeding device at a number of positions within hydraulic braking systems to enable any air trapped within the system to be bled. Such bleeding devices are normally in the form of a bleed screw received within a threaded bleed port in a component of the system. Such bleed screws typically have a sealing cone at a first of its ends that seals against a conical seat in the bleed port to close the port. The bleed screw also includes an axial passageway extending from its second end and terminates at one or more radially extending passageways above the sealing cone. It is typical for the second end of the bleed screw to include a nipple for interference fit connection with one end of a bleeding tube or hose whose other end may feed into a fluid container.

To bleed the system, the bleed screw is loosened via a hexagonal flange so as to withdraw the sealing cone from its sealed position, thereby opening fluid communication between the bleed port and the radial and axial passageways to enable air to escape from the system. When hydraulic brake fluid begins to escape, the bleed screw is tightened to reseal the port. This process is repeated at any position that is believed to contain air until the system is bled fully.

Bleed screws of this type can be exposed to harsh conditions, which can lead to corrosion, damage and the like.

U.S. Pat. No. 5,447,214 attempts to mitigate such risks by providing a two-part bleeding device including a valve base for insertion into the bleed port and a valve cap for covering the valve base. The base includes an axial through passageway, a sealing cone at a first of its ends for sealing engagement with the conical seat at the base of a bleed port and a conical seat at a second of its ends for sealing engagement with the valve cap. The valve cap includes a main body with a blind bore having a sealing cone at its base and a nipple extending from the main body with a fluid passageway extending from the open end of the nipple to an intermediate part of the sealing face of the sealing cone. In use, the valve cap receives the second end of the valve base such that the sealing cone seats and seals against the conical seat of the valve base and the valve cap is loosened to open fluid communication between the axial through passageway of the valve base and the fluid passageway of the valve cap to enable the system to be bled. An O-ring seal is provided between the valve base and the valve cap to prevent ingress into their mating threads of contaminants, thereby mitigating the risk of corrosion.

Whilst the bleeding device of U.S. Pat. No. 5,447,214 mitigates the risk of corrosion of the device, the complexity of the device is increased, thereby increasing manufacturing costs. The Applicant has also observed that the risk of damage is increased because the addition of the valve cap causes the device to project further from the component within which the bleeding device is received. This can present difficulties in harsh environments, for example those experienced in motorsport.

SUMMARY

It would therefore be desirable to provide a bleeding device that mitigates one or more of the aforementioned risks and/or other issues associated with known bleeding devices. It is a more general non-exclusive aim of the invention to provide an improved bleeding device, which is more reliable and/or easier to manufacture and/or simpler.

Accordingly, a first aspect of the invention provides a bleeding device for bleeding air from a hydraulic system, the device comprising a valve member and a bleed connector, the valve member comprising a socket, a sealing face and a fluid passageway between the sealing face and the socket, the bleed connector comprising a plug for releasable engaging receipt within the socket of the valve member and a fluid passageway which is in fluid communication with the fluid passageway of the valve member when the plug is received within the socket, wherein the valve member is movable, in use, between a sealed position in which the sealing face seats against the sealing face of a bleed port and a bleeding position in which the sealing face is unseated to open fluid communication between the bleed port and the fluid passageways.

By separating the bleeding device into a valve member and a bleed connector, the bleed connector can be removed in use.

The bleed connector may comprise a drive member or vice versa. At least one or each of the plug and the socket may comprise a driving feature. The fluid passageways may be in fluid communication when the driving features are engaged. The drive member may be operable to transmit, in use, a force to the valve member, e.g. via the driving features, to move the valve member from the sealed position to the bleeding position.

Another aspect of the invention provides a bleeding device, e.g. for bleeding air from a hydraulic system, the device comprising a valve member and a drive member, the valve member comprising a driving feature, a sealing face and a fluid passageway between the sealing face and the driving feature, the drive member comprising a driving feature for engaging, e.g. releasably engaging, the driving feature of the valve member and a fluid passageway which is in fluid communication with the fluid passageway of the valve member when the driving features are engaged, wherein the drive member is operable to transmit, in use, a force to the valve member via the driving features to move the valve member between a sealed position in which the sealing face seats against the sealing face of a bleed port and a bleeding position in which the sealing face is unseated to open fluid communication between the bleed port and the fluid passageways.

The provision of a drive member that is operable to unseat the valve member whilst being in fluid communication with the bleed port enables the valve member to be simplified. The bleed nipple in prior art devices may be incorporated within the drive member or replaced altogether by a special tool that incorporates the drive member and a passageway that directs fluid bled from the system to a reservoir, for example.

Although the device of the invention includes two components rather than only one, which arguably adds complexity, a single drive member may be used for multiple valve members which reduces the cost of the overall bleeding system.

The driving feature is preferably inboard of the outermost dimension of the valve member. In some embodiments, the valve member may include an external screw thread, e.g. for engaging a bleed port. The screw thread may comprise the maximum outer dimension of the valve member and/or the driving feature may be inboard of the screw thread.

The valve member may be receivable, in use, within a bleed port in a substrate with an exposed end substantially flush with, or recessed with respect to, the substrate.

The drive member may be operable to transmit, in use, a force to the valve member via the driving features to move the valve member from the sealed position to the bleeding position and/or vice versa. The force may comprise a torque.

The valve member, e.g. the driving feature thereof, may comprise a socket and/or the drive member, e.g. the driving feature thereof, may comprise a plug. Additionally or alternatively, the valve member, e.g. the driving feature thereof, may comprise a plug and/or the drive member, e.g. the driving feature thereof, may comprise a socket. In some embodiments, the valve member comprises a plug within a socket, e.g. nested therewithin, and/or the drive member comprises a plug with a socket therein, e.g. nested therewithin. In such embodiments, the plug of the drive member may be received within the socket of the valve member with the nested plug of the valve member received within the nested socket of the drive member. In such embodiments, the force may be applied either by the plug of the drive member to the socket of the valve member or by the nested socket of the drive member to the nested plug of the valve member or both.

Yet another aspect of the invention provides a bleed screw for bleeding air from a hydraulic system, the bleed screw comprising a body with an external screw thread, a socket inboard of the screw thread and accessible from a first end of the body, a sealing face at or adjacent a second end of the body and a fluid passageway between the sealing face and the socket, wherein the bleed screw is movable between a sealed position in which the sealing face seats, in use, against the sealing face of a bleed port and a bleeding position in which the sealing face is unseated to open fluid communication between the bleed port and the fluid passageway.

The socket may comprise a driving feature, which may be nested within the threaded portion of the body. The bleed screw may be movable, in use, by a torque applied to the driving feature from the sealed position to the bleeding position.

Another aspect of the invention provides a bleeding device for bleeding air from a hydraulic system, the device comprising a valve member and a drive member, the valve member comprising a socket, a sealing face and a fluid passageway between the sealing face and the socket, the drive member comprising a plug for engaging receipt within the socket of the valve member and a fluid passageway which is in fluid communication with the fluid passageway of the valve member when the plug is received within the socket, wherein the drive member is operable to apply, in use, a force to the socket to move the valve member between a sealed position in which the sealing face seats against the sealing face of a bleed port and a bleeding position in which the sealing face is unseated to open fluid communication between the bleed port and the fluid passageways.

The drive member may comprise a needle, for example a bleed needle or bleeding needle, hereinafter bleeding needle. The drive member may comprise a body, for example to which the driving feature is connected, e.g. formed or integral with or initially separate and subsequently connected. The driving feature may be connected to the body by shear means, which may be configured to separate the driving feature from the body if the force applied exceeds a predetermined threshold. The shear means may comprise a necked portion or otherwise frangible or weakened portion, e.g. of the drive member or body. The body may comprise an engaging feature, such as a hexagonal flange or other feature, for engaging with a tool to apply the force to the drive member.

The device may comprise a seal or seal means, e.g. for sealing the connection between the fluid passageways. The valve member may comprise a recess, e.g. between the sealing face and the driving feature. The driving feature of the drive member may comprise an extension. The extension may comprise a seal, e.g. for cooperation with a facing surface of the recess, for example to provide the seal means. The seal may comprise an O-ring seal, which may be received within a recess or groove, e.g. a circumferential recess or groove, of the plug or an extension thereof.

One of the driving features may comprise a keyway and/or the other may comprise a key. The key may be suitable or adapted or configured for engaging the keyway, for example to enable a torque to be transmitted, in use, to the valve member by the drive member.

One or both driving features, e.g. the socket and/or the plug, may comprise one or more flats, e.g. cooperating flats. The flats may be to enable, e.g. configured or operable to enable, a torque to be transmitted, in use, to the valve member by the drive member.

The driving features, e.g. the socket and plug, may comprise cooperating cylindrical portions with opposed flats. Additionally or alternatively, the driving features, e.g. the socket and plug, may comprise cooperating polygonal cross-sections or portions each having a polygonal cross-section. Additionally or alternatively, the driving features, e.g. the socket and plug, may comprise one or more cooperating splines.

The driving member may comprise a bleed connector. The driving member or bleed connector may comprise nipple or connection member, e.g. for receipt, in use, within a bleed tube. The bleed connector or nipple or connection member may comprise a flange, bulge or ridge, e.g. a circumferential bulge or ridge. The flange, bulge or ridge may be radial or extend radially and/or be for providing an interference fit with an internal surface of a bleed tube.

The driving member may comprises a drive means, such as a flange, for applying a torque thereto. The drive means may comprise a polygonal driving flange, which may be configured or operable to cooperate with a driving tool, such as a spanner. In embodiments, the driving member forms part of a tool with a handle for applying a torque thereto.

The valve member may comprise an external thread and/or a conical sealing face, which conical sealing face may comprise or provide the sealing face. In embodiments, the valve member comprises a bleed screw with an external thread and a conical sealing face.

The fluid passageway of the valve member may comprise an axial segment and/or one or more terminal segments. The one or more terminal segments may extend at an angle or radially relative to the axial segment. The valve member may comprise a cylindrical portion, e.g. between the external thread and the sealing face. The one or more terminal segments may comprise a pair of radial segments, for example each with an opening in a circumferential surface of the cylindrical portion.

Another aspect of the invention provides a valve member as described above.

A further aspect of the invention provides a bleed screw for bleeding air from a hydraulic system, the bleed screw comprising a body with an external screw thread, a driving feature inboard of the screw thread and accessible from a first end of the body, a sealing face at or adjacent a second end of the body and a fluid passageway between the sealing face and the driving feature, wherein the bleed screw is movable by a torque applied to the driving feature between a sealed position in which the sealing face seats, in use, against the sealing face of a bleed port and a bleeding position in which the sealing face is unseated to open fluid communication between the bleed port and the fluid passageway.

The driving feature may be nested within the threaded portion of the body or may extend therefrom. In the latter case, it is preferable that the length of the bleed screw is less than that of the bleed port such that the driving feature does not protrude from the port, in use.

The external screw thread may comprise the maximum outer dimension of the body, e.g. such that the bleed screw is threadedly receivable, in use, within a bleed port in a substrate with its first end substantially flush with, or recessed with respect to, the substrate.

The driving feature of the bleed screw may comprise a socket. Additionally or alternatively, the driving feature of the bleed screw may comprise a plug or spigot. In embodiments, the driving feature comprises a plug or spigot within a socket.

A yet further aspect of the invention provides a drive member as described above.

Another aspect of the invention provides a bleeding needle comprising a driving feature for engaging, e.g. releasably engaging, the driving feature of a valve member, e.g. a bleed screw, and a fluid passageway which is configured to be in fluid communication with the fluid passageway of the valve member when the driving features are engaged, wherein the bleeding needle is operable to transmit, in use, a force to the valve member via the driving features to move the valve member between a sealed position in which it is seated against the sealing face of a bleed port and a bleeding position in which the sealing face is unseated to open fluid communication between the bleed port and the fluid passageways.

The bleeding needle may comprise a body, for example to which the driving feature is connected, e.g. formed or integral with or initially separate and subsequently connected. The driving feature may be connected to the body by shear means, which may be configured to separate the driving feature from the body if the torque applied exceeds a predetermined threshold. The shear means may comprise a necked portion or otherwise frangible or weakened portion, e.g. of the bleeding needle or body.

Other aspects of the invention provide a braking system component, for example a brake caliper, comprising a bleeding device or bleed screw as described above, a braking system comprising such a component and a vehicle comprising such a braking system.

Another advantage of the invention is that whilst the valve member may experience high temperatures transferred from the component (e.g. a brake caliper), the drive member is initially separate which reduces the likelihood of the bleeding tube or hose melting in use.

Another aspect of the invention provides a method of bleeding a hydraulic system using a bleeding device or bleed screw as described above. The method may also comprise any one or more features or steps outlined above in relation to known bleeding systems.

Yet another aspect of the invention provides a method of bleeding a hydraulic system, the method comprising engaging a drive feature or plug of a drive member or bleed connector with a drive feature or socket of a valve member such that respective fluid passageways therein are in fluid communication with each other and applying a torque to the drive member or bleed connector, e.g. to the driving socket using the drive member, to move the valve member between a sealed position, in which a sealing face thereof seats and seals against the sealing face of a bleed port, and a bleeding position in which the sealing face is unseated to open fluid communication between the bleed port and the fluid passageways.

The torque may be applied in a loosening or first direction and/or may comprise a loosening torque. The method may comprise applying a torque in a loosening or first direction to the drive member to move the valve member from the sealed position to the bleeding position.

The torque may be applied in a tightening or second direction and/or may comprise a tightening torque. The method may comprise applying a torque in a tightening or second direction to the drive member to move the valve member from the bleeding position to the sealed position. The method may comprise applying a torque in a tightening or second direction to the drive member until the drive feature of the drive member shears or severs or breaks away therefrom.

For the avoidance of doubt, any of the features described herein apply equally to any aspect of the invention. For example, the bleeding device may comprise any one or more features of the bleed screw relevant thereto of vice versa. Similarly, the method may comprise any one or more features or steps relevant to one or more features of the bleeding device or bleed screw or vice versa.

Another aspect of the invention provides a computer program element comprising and/or describing and/or defining a three-dimensional design for use with a simulation means or a three-dimensional additive or subtractive manufacturing means or device, e.g. a three-dimensional printer or CNC machine, the three-dimensional design comprising an embodiment of one of the bleeding device, valve member, drive member or bleed screw described above.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. For the avoidance of doubt, the terms "may", "and/or", "e.g.", "for example" and any similar term as used herein should be interpreted as non-limiting such that any feature so-described need not be present. Indeed, any combination of optional features is expressly envisaged without departing from the scope of the invention, whether or not these are expressly claimed. The Applicant reserves the right to change any originally filed claim or file any new claim accordingly, including the right to amend any originally filed claim to depend from and/or incorporate any feature of any other claim although not originally claimed in that manner.

THE DRAWINGS

Embodiments of the invention will now be described by way of example only with reference to the accompanying drawings in which.

DETAILED DESCRIPTION

Figure 1:
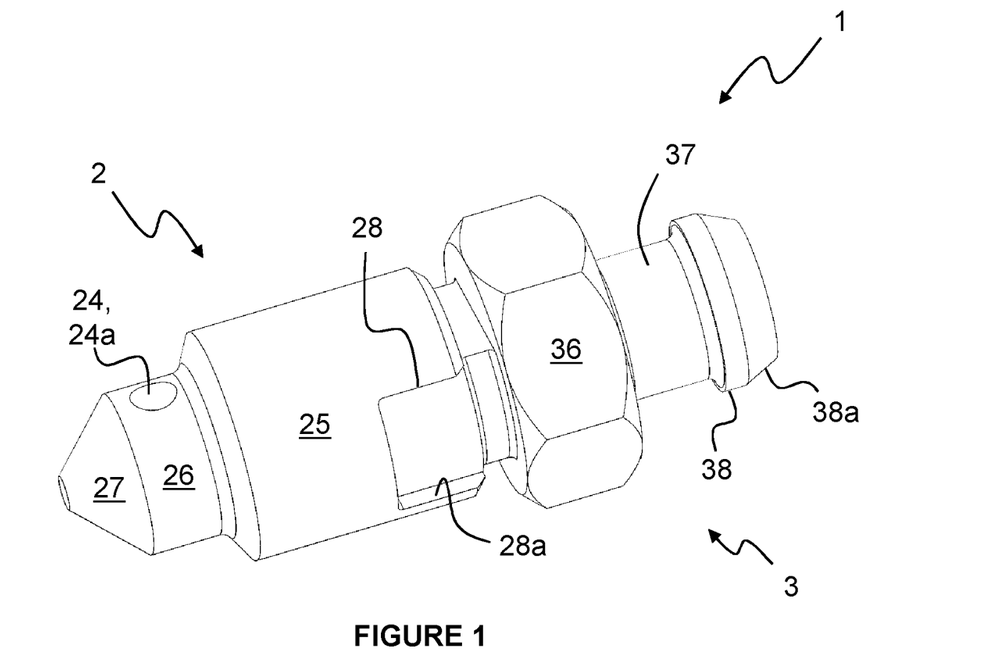
FIG. 1 is a perspective view of a bleeding device according to an embodiment of the invention.

Referring now to FIG. 1, there is shown a bleeding device 1 for bleeding air from a hydraulic braking system (not shown). The device 1 includes a valve member in the form of a bleed screw 2 for sealing receipt within one or more positions of a hydraulic braking system (not shown) and a drive member in the form of a bleeding needle 3 for unseating the bleed screw 2 to enable any air trapped within the system to be bled.

Figure 2:
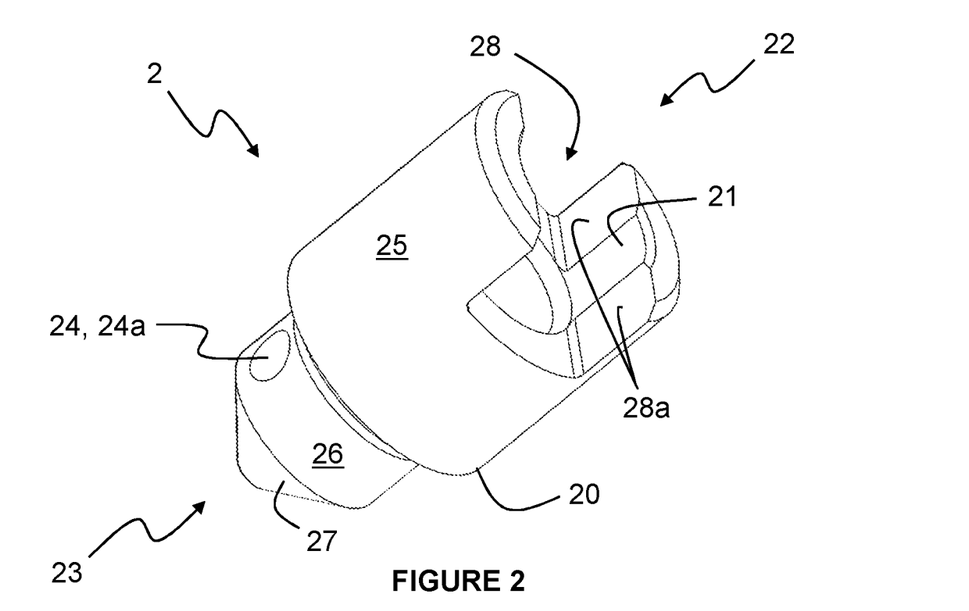
FIG. 2 is a perspective view of the bleed screw of the bleeding device of FIG. 1.

The bleed screw 2 in this embodiment, shown more clearly in FIG. 2, includes a body 20 with an axial blind passage 21 open to and extending from a first, driving end 22 toward a second, sealing end 23 and terminating at the centre of a radial passage 24. The body 20 includes a threaded portion 25 with an external screw thread extending from the first end 22, a cylindrical portion 26 extending from the threaded portion 25 toward the second end 23 and a conical sealing face 27 at the second end 23. The body 20 also includes a driving feature 28 inboard of the screw thread 25 and accessible from the first end 22. In this embodiment, the driving feature 28 is in the form of a transverse slot intersecting the axial passage 21 and having a thickness of approximately half of the threaded portion 25 of the body 20, which forms a socket 28 with a pair of opposed flats 28a on each side of the axial passage 21. The thickness of the slot may be more or less than that shown and/or may be replaced with another driving feature as described herein.

Figure 4:
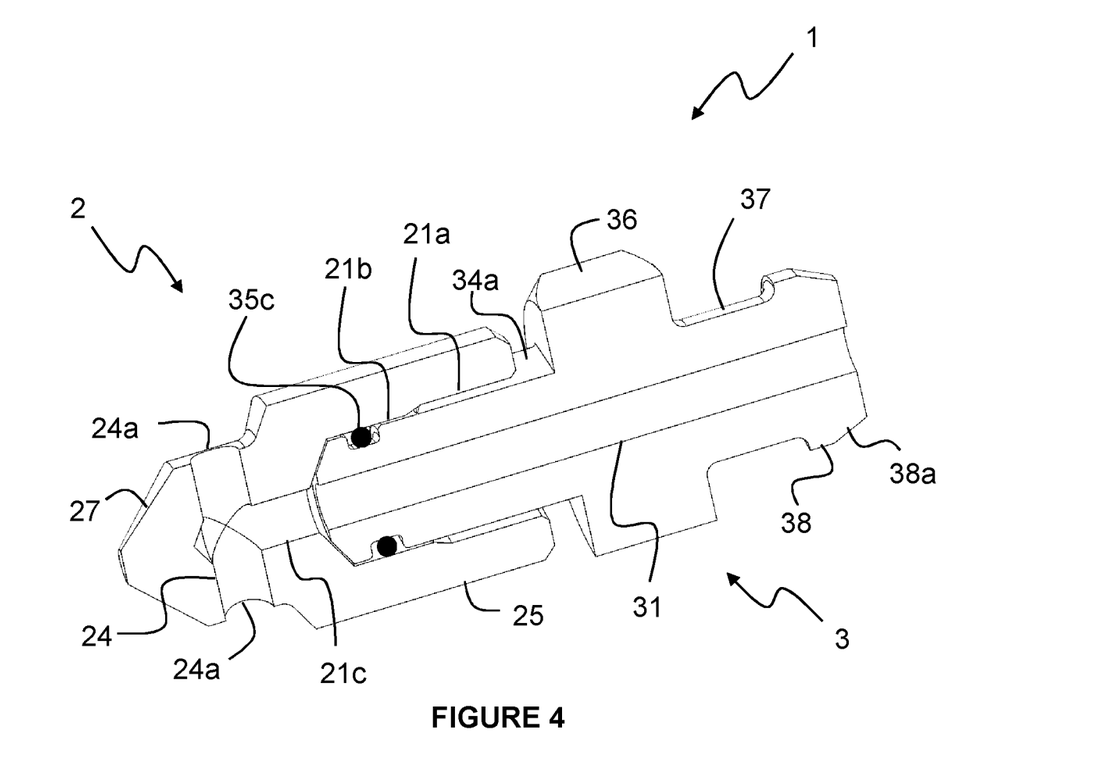
FIG. 4 is a cross-sectional perspective view of the bleeding device of FIG. 1.
Figure 5:
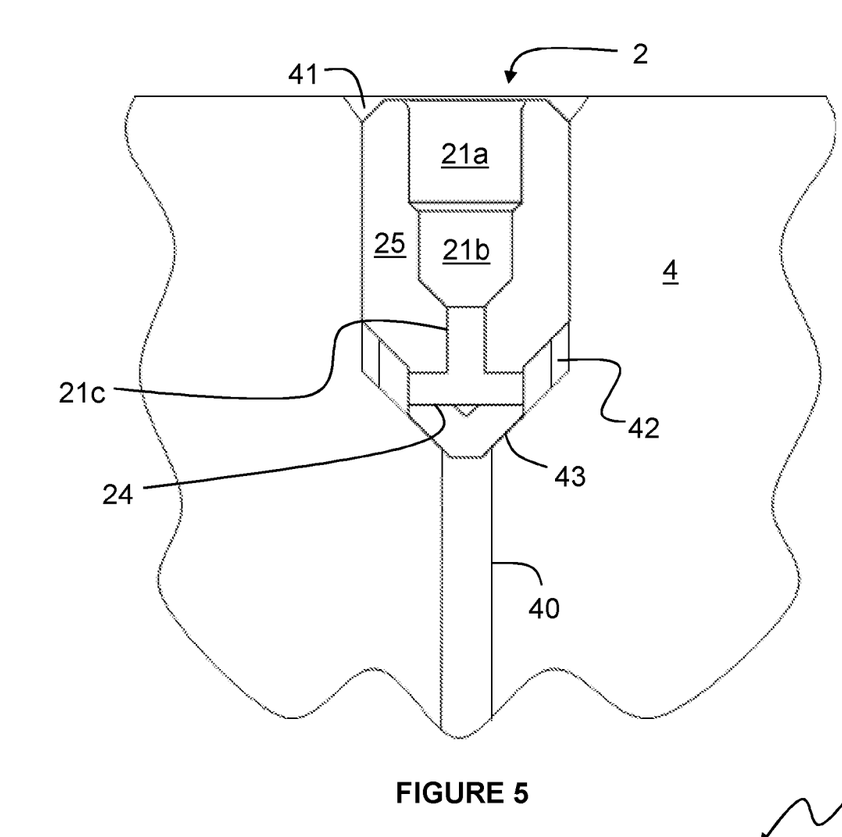
FIG. 5 is a section view of the bleed screw of FIG. 3 received within the bleed port of a caliper.

As shown more clearly in FIGS. 4 and 5, the axial passage 21 of the bleed screw 2 includes first, second and third portions 21a, 21b, 21c. The first, lead-in portion 21a opens to the first end 22 of the body 20, has a first diameter and is connected to the second, sealing portion 21b. The second portion 21b has a second diameter slightly smaller than the first diameter and is connected to the third, intersecting portion 21c. The third portion 21c has a third diameter smaller than the second diameter and terminates within the cylindrical portion 26, inboard of the second end 23 of the body 20.

The radial passage 24 extends radially from one side of the cylindrical portion 26 to the other to form openings or inlets 24a on opposite lateral sides of the cylindrical portion, inboard or downstream of the conical sealing face 27. The radial passage 24 intersects at its centre the intersecting portion 21c of the axial passage 21 such that a fluid flow passageway is formed from the radial inlets 24a to the first end 22 of the body 20 via the radial and axial passages 21, 22.

Figure 3:
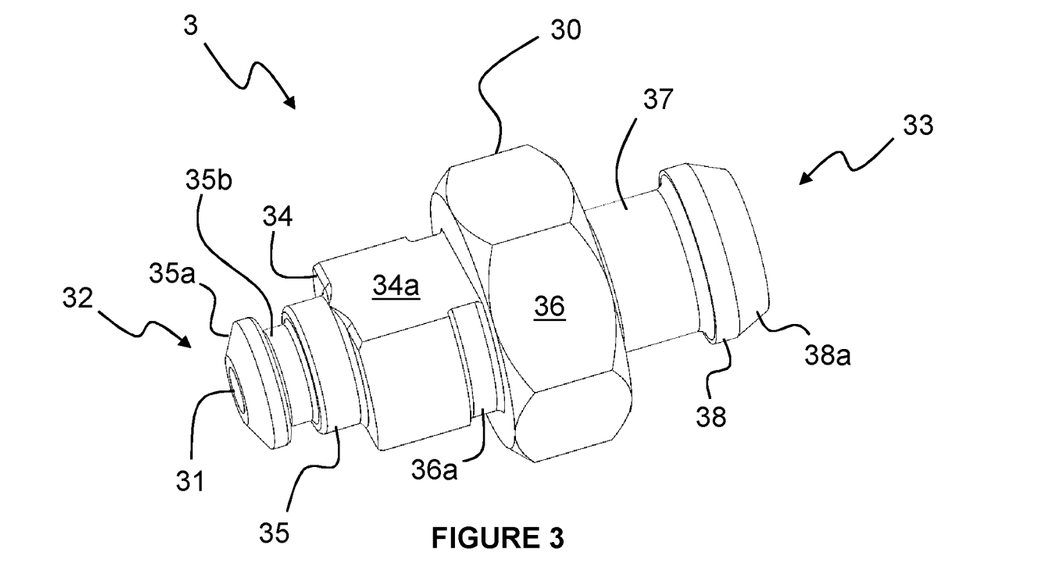
FIG. 3 is a perspective view of the bleeding needle of the bleeding device of FIG. 1.

As shown more clearly in FIG. 3, the bleeding needle 3 includes a body 30 with an axial through passage 31 open to and extending between a first, driving end 32 and a second, bleeding end 33. The body 30 of the bleeding needle 3 includes a driving portion 34, a sealing extension 35, a hexagonal flange 36 and a bleed connector 37.

The driving portion 34 of the bleeding needle 3 is substantially cylindrical, forming a plug 34 for receipt within the socket 28 of the bleed screw 2. The driving portion incorporates a driving feature 34a in the form of flats formed on opposing lateral sides thereof. The sealing extension 35 is substantially cylindrical, extends from the driving portion 34 with a smaller outside diameter than the driving portion 34 and forms the first end 32. The sealing extension 35 includes a tapered lead-in 35a at the first end 32 and a circumferential groove 35b for receiving an O-ring seal 35c (shown in FIG. 4).

The hexagonal flange 36 is configured to cooperate with a tool (not shown), such as a spanner, and is joined by a necked portion 36a to the driving portion 34 of the body 30 on the opposite side thereof to the sealing extension 35. The necked portion 36a provides a shear means in this embodiment, but it would be appreciated by the skilled person that the necked portion 36a may be omitted or replaced with other shear means, such as a fastener connecting the hexagonal flange 36 to the driving portion 34 and having predetermined shear characteristics.

The bleed connector 37 is substantially cylindrical in shape and extends from the hexagonal flange 36 on the opposite side thereof to the driving portion 34 and forms the second end 33. The bleed connector 37 includes a radial flange 38 with a lead-in taper 38a at the second end 33. The bleed connector 37 is configured to be received within an end of a bleed tube (not shown) such that the radial flange 38 is in interference fit therewith in a similar manner to known bleed nipples.

Referring now to FIG. 5, there is shown a brake caliper 4 with a fluid passageway 40 forming part of a hydraulic brake circuit in a vehicle (not shown). The brake caliper 4 includes a bleed port 41 with an internal thread 42 and a conical seat 43 at the base of the bleed port 41 and in fluid communication with the fluid passageway 40. The bleed screw 2 is shown received within the bleed port 41 and threadedly engaged therewith such that the conical sealing face 27 is in sealing engagement with the conical seat 43 of the bleed port 41, thereby sealing off the radial passage 24 of the bleed screw 2 from the fluid passageway 40.

As will be appreciated, the bleed screw 2 is received entirely within the bleed port 41. As such, there are no protruding portions as there would be in the aforementioned known bleeding devices. In embodiments, the bleeding device 1 may be provided with a sealing plug (not shown) insertable into the first, lead-in portion 21a of the axial passage 21 with, for example, a domed head configured to inhibit ingress of fluid and particulate matter.

In use and to bleed the braking system, the sealing extension 35 of the bleeding needle 3 is inserted into the lead-in portion 21a of the axial passage 21 of the bleed screw 2 and pushed into sealing engagement with the sealing portion 21b thereof. The axial through passage 31 of the bleeding needle 3 is therefore in sealed fluid communication with the axial passage 21 of the bleed screw 2. A bleed tube (not shown) may then be placed over the bleed connector 37 with its other end placed in a reservoir.

A loosening torque is then applied to the hexagonal flange 36 of the bleeding needle 3, which is transmitted to the bleed screw 2 through the flats 34a, 28a, to unseat the conical sealing face 27 from the conical seat 43. This opens fluid communication between the fluid passageway 40 in the caliper 4 and the radial passage 24 in the bleed screw 2. Thus, fluid is able to escape from the hydraulic braking system (not shown) to the reservoir (not shown) through the passageway 40, the radial and axial passages 24, 21 of the bleed screw 2, the axial through passage 31 of the bleeding needle 3 and through the bleed tube (not shown). The braking system is bled in the normal way.

In order to reseal the bleed screw 2 within the bleed port 41, a reverse, tightening torque is applied to the hexagonal flange 36 the bleeding needle 3. This torque is transmitted to the bleed screw 2 through the flats 34a, 28a and re-seats the conical sealing face 27 to the conical seat 43.

In this embodiment, the necked portion 36a is configured, i.e. sized and dimensioned, to ensure that no more than a predetermined torque may be applied. More specifically, the necked portion 36a is configured to shear at a predetermined torque, which corresponds to an over-torque that would otherwise risk damaging the bleed screw 2 and/or bleed port 41.

Thus, in the event of an over-torque being applied to the bleeding needle 3, the necked portion 36a would be severed, thereby preventing the torque from being transmitted to the bleed screw 2. The severed driving portion 34 and sealing extension 35 could then be removed and a new bleeding needle 3 used when the system next requires bleeding.

Figure 6:
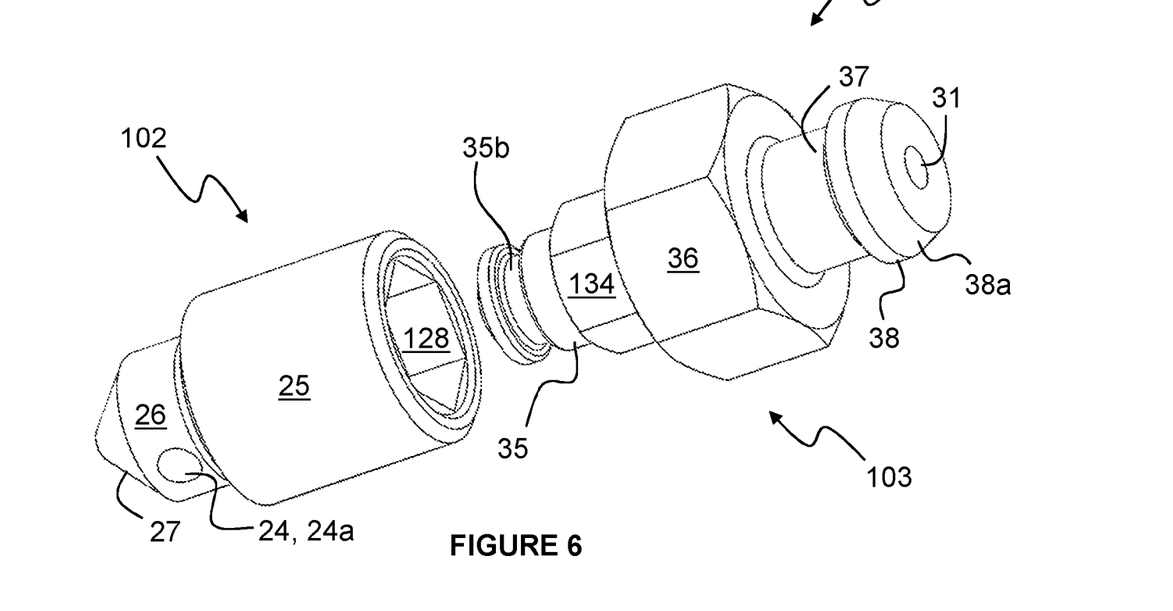
FIG. 6 is an exploded perspective view of a bleeding device according to another embodiment of the invention.

Turning now to FIG. 6, there is shown a bleeding device 100 according to another embodiment similar to the bleeding device 1 described above, wherein like references depict like features that will not be described further herein. The bleeding device 100 according to this embodiment differs to that of the previous embodiment in that the driving features 128, 134 of the bleed screw 102 and bleeding needle 103 are hexagonal. More specifically, the first, lead-in portion 21a of the bleed screw 2 is replaced with a hexagonal socket portion 128 and the driving portion 34 of the bleeding needle 3 is replaced with a hexagonal plug portion 134.

In use, the hexagonal plug portion 134 of the bleeding needle 103 is received within the hexagonal socket portion 128 of the bleed screw 102 such that the torque applied as outlined above is transmitted from the bleeding needle 103 to the bleed screw 102 via these portions 134, 128.

It will be appreciated by those skilled in the art that several variations to the aforementioned embodiments are envisaged without departing from the scope of the invention. For example, the driving features 34, 34a, 28, 134, 128 may be replaced with other driving features, such as keys/keyways, splines or any other cooperating arrangement, provided they are consistent with the disclosure herein. In some embodiments, the socket 28, 128 may include a projection or plug (not shown) nested therein and/or the sealing projection 35 may be replaced with a socket (not shown) within the driving portion 34 or hexagonal plug portion 134. Such embodiments are preferably configured such that an outer surface of the driving portion 34 or hexagonal plug portion 134 transmits the torque, but it is also envisaged that the socket (not shown) therein may transmit the torque to the projection or plug (not shown) of the bleed screw 2, 102. Other arrangements are also envisaged. Whilst preferable, the socket 28, 128 of the bleed screw 2, 102 need not be driven or drivable by the bleeding needle 3, 103.

Several features described may be omitted or replaced with other features performing similar functions, provided they are consistent with the disclosure herein. By way of non-limiting example, the shear means is optional and not essential, as are all other features not expressly described explicitly as essential.

It will also be appreciated by those skilled in the art that any number of combinations of the aforementioned features and/or those shown in the appended drawings provide clear advantages over the prior art and are therefore within the scope of the invention described herein.

The invention claimed is:

1. A bleeding device for bleeding air from a hydraulic system, the device comprising a valve member and a bleed connector, the valve member comprising a threaded portion having an external screw thread, a socket with a driving portion nested within the threaded portion, a sealing face and a fluid passageway between the sealing face and the socket, the bleed connector comprising a plug with a driving portion for releasable engaging receipt within the socket of the valve member and a fluid passageway which is in fluid communication with the fluid passageway of the valve member when the plug is received within the socket, wherein the valve member is movable, in use, between a sealed position in which the sealing face seats against the sealing face of a bleed port and a bleeding position in which the sealing face is unseated to open fluid communication between the bleed port and the fluid passageways.

2. The bleeding device according to claim 1, wherein the fluid passageways are in fluid communication when the driving portions are engaged, and the bleed connector is operable to transmit, in use, a force to the valve member via the driving portions to move the valve member from the sealed position to the bleeding position.

3. The bleeding device according to claim 1, wherein the bleed connector comprises a body to which the driving portion of the plug is connected by a shear portion configured to separate the driving portion from the body if the torque applied exceeds a predetermined threshold corresponding to an over-torque that would otherwise risk damaging the valve member or a bleed port within which it is received.

4. The bleeding device according to claim 3, wherein the shear portion comprises a necked portion.

5. The bleeding device according to claim 1, wherein each driving portion comprises one or more cooperating flats to enable a torque to be transmitted, in use, to the valve member by the bleed connector.

6. The bleeding device according to claim 1, wherein the driving portions comprise cooperating cylindrical portions with opposed flats.

7. The bleeding device according to claim 1, wherein the driving portions comprise cooperating portions each having a polygonal cross-section.

8. The bleeding device according to claim 1, wherein the bleed connector comprises a polygonal driving flange for applying a torque thereto.

9. The bleeding device according to claim 1, wherein the bleed connector forms part of a tool with a handle for applying a torque thereto.

10. The bleeding device according to claim 1 comprising a seal for sealing the connection between the fluid passageways.

11. The bleeding device according to claim 10, wherein the seal comprises an O-ring seal received within a circumferential groove of the plug.

12. The bleeding device according to claim 1, wherein the bleed connector comprises a nipple for receipt, in use, within a bleed tube.

13. The bleeding device according to claim 1, wherein the valve member comprises a bleed screw with a conical sealing face.

14. The bleeding device according to claim 1, wherein the fluid passageway of the valve member comprises an axial segment and one or more terminal segments extending at an angle or radially relative to the axial segment.

15. The bleeding device according to claim 14, wherein the valve member comprises a cylindrical portion between the external thread and the sealing face and the one or more terminal segments comprise a pair of radial segments each with an opening in a circumferential surface of the cylindrical portion.

16. A braking system component comprising a bleeding device according to claim 1.

17. A bleed screw for bleeding air from a hydraulic system, the bleed screw comprising a body with a threaded portion having an external screw thread, a socket with a driving portion nested within the threaded portion and accessible from a first end of the body, a sealing face at or adjacent a second end of the body and a fluid passageway between the sealing face and the socket, wherein the bleed screw is movable between a sealed position in which the sealing face seats, in use, against the sealing face of a bleed port and a bleeding position in which the sealing face is unseated to open fluid communication between the bleed port and the fluid passageway.

18. A bleeding device for bleeding air from a hydraulic system, the device comprising a valve member and a bleed connector, the valve member comprising a socket with a driving portion, a sealing face and a fluid passageway between the sealing face and the socket, the bleed connector comprising a plug with a driving feature for releasable engaging receipt within the socket of the valve member and a fluid passageway which is in fluid communication with the fluid passageway of the valve member when the plug is received within the socket, wherein the valve member is movable, in use, between a sealed position, in which the sealing face seats against the sealing face of a bleed port, and a bleeding position, in which the sealing face is unseated to open fluid communication between the bleed port and the fluid passageways, the bleed connector comprising a body to which the driving portion of the plug is connected by a shear portion that is sized and dimensioned to shear at a predetermined torque corresponding to an over-torque that would otherwise risk damaging the valve member or a bleed port within which it is received.

19. The bleeding device according to claim 18, wherein the shear portion comprises a necked portion.

20. The bleeding device according to claim 19, wherein the driving portion of the plug is substantially cylindrical and with flats formed on opposing lateral sides thereof.

* * * * *